United States Patent
Dorn et al.

(10) Patent No.: US 10,972,580 B1
(45) Date of Patent: Apr. 6, 2021

(54) DYNAMIC METADATA ENCRYPTION

(71) Applicant: Amazon Technologies, Inc., Seattle, WA (US)

(72) Inventors: Bertram U. Dorn, Fürstenfeldbruck (DE); David Walker, Old Basing (GB)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 15/839,565

(22) Filed: Dec. 12, 2017

(51) Int. Cl.
H04L 29/06 (2006.01)
H04L 9/08 (2006.01)
G06F 21/60 (2013.01)
H04L 29/08 (2006.01)
G06F 9/451 (2018.01)
H04L 12/24 (2006.01)
H04L 12/66 (2006.01)

(52) U.S. Cl.
CPC ............ H04L 67/32 (2013.01); G06F 9/451 (2018.02); H04L 9/0816 (2013.01); H04L 12/66 (2013.01); H04L 41/0246 (2013.01); H04L 41/0803 (2013.01); H04L 67/142 (2013.01); H04L 67/2804 (2013.01)

(58) Field of Classification Search
CPC ... H04L 67/32; H04L 9/0816; H04L 67/2804; G06F 9/451
See application file for complete search history.

(56) References Cited

U.S. PATENT DOCUMENTS

| | | | | |
|---|---|---|---|---|
| 7,146,505 B1* | 12/2006 | Harada | ................ | G06Q 20/206 713/185 |
| 8,856,910 B1* | 10/2014 | Rostami-Hesarsorkh | .................... | H04L 63/1408 713/160 |
| 8,997,198 B1* | 3/2015 | Kelley | ................... | G06F 21/335 726/10 |
| 10,019,244 B1* | 7/2018 | Rocamora | ........... | G06F 9/45508 |
| 10,193,822 B1* | 1/2019 | Bacus | ................... | H04L 47/823 |
| 2003/0135509 A1* | 7/2003 | Davis | .................. | H04L 63/0227 |
| 2003/0212818 A1* | 11/2003 | Klein | .................... | H04L 69/329 709/238 |
| 2006/0020693 A1* | 1/2006 | Hellstrom | ............... | H04L 69/04 709/223 |
| 2007/0232316 A1* | 10/2007 | Reda | .................... | H04L 63/0442 455/445 |
| 2015/0188900 A1* | 7/2015 | Charbonneau | ...... | H04L 63/0807 726/7 |
| 2016/0006750 A1* | 1/2016 | Yang | ....................... | G06F 21/55 726/22 |
| 2017/0160919 A1* | 6/2017 | Wu | ...................... | G06F 3/04817 |
| 2017/0171166 A1* | 6/2017 | Li | ............................ | H04L 67/42 |
| 2017/0351536 A1* | 12/2017 | Kamalakantha | .......... | G06F 9/54 |

(Continued)

*Primary Examiner* — Mohammad A Siddiqi
(74) *Attorney, Agent, or Firm* — Davis Wright Tremaine LLP

(57) ABSTRACT

A system intercepts, at an application programming interface (API) gateway, a request for access to a computing resource and obfuscates metadata associated with the request. The metadata is obfuscated by at least encrypting the metadata to generate encrypted metadata. The API gateway further generates a second request to include the encrypted metadata. The second request is then used to access the computing resource in response to the first request such that when the computing resource is accessed, the metadata associated with the computing resource is encrypted.

20 Claims, 8 Drawing Sheets

(56) References Cited

U.S. PATENT DOCUMENTS

| | | | |
|---|---|---|---|
| 2018/0034848 A1* | 2/2018 | Jalan | H04L 63/1458 |
| 2018/0089005 A1* | 3/2018 | Green | G06F 9/547 |
| 2018/0101851 A1* | 4/2018 | Lowenberg | G06Q 20/4016 |
| 2019/0018961 A1* | 1/2019 | Kostyushko | G06F 7/582 |
| 2019/0140895 A1* | 5/2019 | Ennis, Jr. | G06F 9/541 |
| 2020/0242664 A1* | 7/2020 | Shah | G06Q 30/0269 |

\* cited by examiner

US 10,972,580 B1

DYNAMIC METADATA ENCRYPTION

BACKGROUND

Modern computer systems place a high importance on security of user access to computing resources and on maintaining current and accurate policies for the permissions of computer system users to access those computing resources. Resource owners, and other administrators of resources, often use such computing resource policies to control access by computer system users to computing resources in order to support the business needs of the resource owners, administrators, and users. Even though access to those computing resources is associated with strict permissions, those computing resources, however, also include metadata that may contain significant confidential information where protection of that information may also be necessary. Generally, in large-scale and other computing environments, metadata associated with computing resources are readily visible when a user device obtains access to a computing resource. Accordingly, a resource owner that grants access to computing resources in order to perform one or more actions on behalf of the resource owner may also want to simultaneously perform one or more actions to ensure that metadata associated with these computing resources is also secure.

BRIEF DESCRIPTION OF THE DRAWINGS

Various techniques will be described with reference to the drawings, in which.

DETAILED DESCRIPTION

Figure 1:
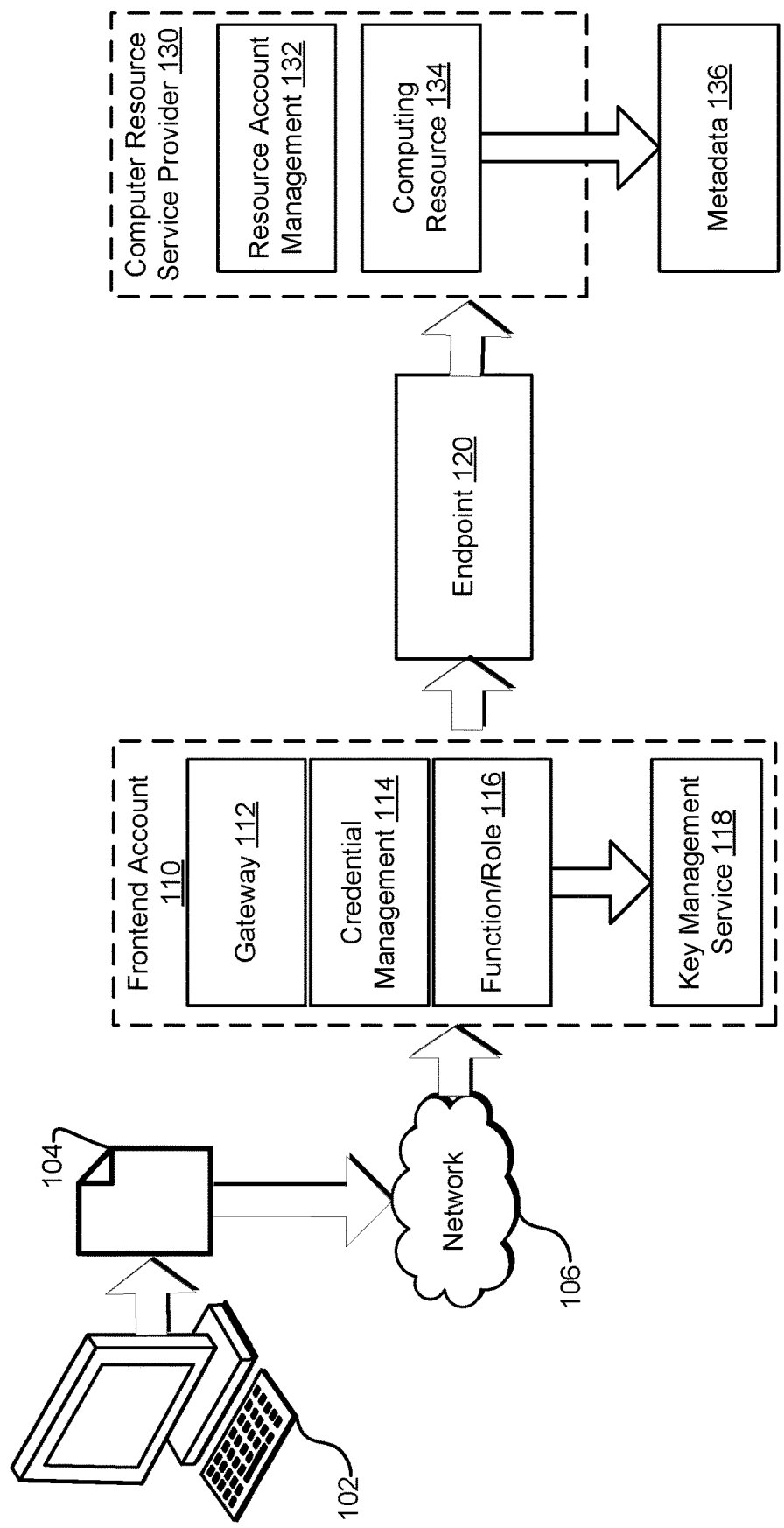
FIG. 1 illustrates, in an embodiment, a system of encrypting metadata associated with a request for access to a computing resource may be practiced.

The present document describes intercepting a request to access one or more computing resources and applying encrypted metadata to the one or more computer resources associated with request. In an embodiment, a request, from a client computing device, is intercepted, at an application programming interface (API) gateway, for access to a computing resource and metadata associated with the request is obfuscated. The metadata is obfuscated by at least encrypting the metadata to generate encrypted metadata. The API gateway further generates a second request to include the encrypted metadata. The second request is then used to access the computing resource in response to the first request such that when the computing resource is accessed, the metadata associated with the computing resource is encrypted and incomprehensible.

In an embodiment, a client computing device may generate and send a request (e.g., API call) for access to a computing resource at an API endpoint. In an embodiment, the request may be intercepted at an API gateway that acts as a proxy for one or more computing resources or services made available through a computer resource service provider. In an embodiment, once the request is intercepted at the API gateway, an identity associated with the request is authenticated using one or more policies specifying whether actions associated with the identity are performable with the one or more computing resources or services made available through the computer resource service provider. Once the request is authenticated, the API gateway may utilize a function to perform fine-grained filtering on the request. In an embodiment, the request is filtered and unpacked, and information from the request may reference metadata (e.g., service tags or tags) associated with the computing resource that the request is attempting to obtain access to. In an embodiment, when the computing resource is accessed, the metadata associated with the computing resource may be visible (e.g., in plaintext form) to computer system users. Thus, in an embodiment, the metadata may be encrypted using an encryption key to generate encrypted metadata. In an embodiment, a new request, at the API gateway, is generated. The new request may include the encrypted metadata and further used to make the call to the API endpoint to request access to the computing resource. In an embodiment, the computing resource with encrypted metadata is then provided in response to the request. From the client's perspective, the computing resource is being accessed directly, and from the computing resources' perspective, it is being accessed by the proxy. As such, through the use of the API gateway, metadata associated with computing resources can be preemptively protected.

In an embodiment, the identity associated with the request is evaluated against one or more policies associated with a credential management service. The credential management service may process the identity associated with the request and determine whether to verify and authenticate the request. In an embodiment, the request is also unpacked such that information can be extracted and the details of the request and/or request logs are stored in a separate storage device. In an embodiment, a function associated with the API gateway filters the request. The function may perform fine-grained filtering of the request. In an embodiment, the function may also be run as a role, which serves to perform permission limitations on the request. The role is managed by the computer resource service provider where metadata associated with the one or more computing resources reside. In an embodiment, a resource account management service in a computer resource service provider may only allow requests to be called via the role.

In an embodiment, a response back to the client may be required. The response may contain encrypted metadata; however, if the function determines, at the API gateway, that the information within the encrypted metadata includes information indicating that a response back to the client computing device is expected, the function may decrypt the encrypted metadata associated with the computing resource. In an embodiment, the response back to the client device may then include the computing resource with metadata in its original plaintext form.

FIG. 1 illustrates, in an embodiment, a system of encrypting metadata associated with a request for access to a computing resource may be practiced. In an embodiment, a client computing device 102 may submit a request (e.g., API call) 104 via a network 106 to an API endpoint 120 for access to a computing resource 134 provided by a computer resource service provider 130. The client computing device 102 may be any appropriate electronic device operable to send and receive requests, messages, and or other such information over an appropriate network. That is, in an embodiment, a client computing device 102 may be a personal computer, a tablet computer, smart phone, a notebook computer, or the like. Moreover, the client computing device 102 may also be a virtual machine or an instance of a virtual machine operating within a computing resource service provider. The client computing device 102 may send requests and messages over network 106. As shown in FIG. 1, client computing device 102 is the sole device illustrated; however, there may be more than one client computing device implemented to send requests and messages to access computing resources at API endpoint 120.

In an embodiment, network 106 is any appropriate network, such as the Internet, intranet, a cellular network, and/or any combination thereof. The network 106 may include one or more client computing devices, one or more servers, and/or clusters of servers interconnected with one another. The communication over the network 106 may be performed over a wired or wireless connection. In an embodiment, the client computing device 102 sends the request 104 over network 106, such as the Internet, via a wired or wireless connection.

In an embodiment, the computer resource service provider 130 may include various types of computing resources that are utilized by user devices or client devices, such as client computing device 102 to perform certain tasks. In an embodiment, the computer resource service provider 130 may include a resource account management service 132 that includes one or more policies. The one or more policies may include information that grants or denies access to a request for computing resources associated with the computer resource service provider 130. That is, the resource account management service 132 may manage user device accounts and information, resource provisioning and usage, and other such aspects pertaining to the computing resources associated with the computer resource service provider 130. In an embodiment, the resource account management service 132 receives an identity of the request 104 and determines whether the request 104 can perform tasks using portions of a computing resource 134 in the computer resource service provider 130 environment. In the computer resource service provider 130 environment, computing resources may be shared amongst a plurality of user devices and the sharing of resources is often referred to as resource sharing, Web services, or "cloud computing," amongst other such terms.

In an embodiment, the computing resource 134 may also be an application server that is operable to process instructions provided by a user device in response to a request. In an embodiment, the computing resource 134 may be a virtual machine, an instance of a virtual machine, or a cluster of virtual machines. The computing resource 134 may be hosted in the computer resource service provider 130 environment by one or more servers or server computers (not depicted in FIG. 1) that are separate from the client computing device 102. In an embodiment, information contained in the request 104 from client computing device 102 may specify one or more computing resources to access. The one or more computing resources may provide at least a portion of their resources in order to satisfy the request. In an embodiment, the computing resource 134 may also be referred to as a service or asset in the computer resource service provider 130 environment.

In an embodiment, an API may define request messages and the structure of response messages enabling data and/or content to be shared among applications and the like. A web API, in an embodiment, may be defined as a set of Hypertext Transfer Protocol (HTTP) request messages and the response message structure can be defined in an Extensible Markup Language (XML) type format, JavaScript® Object Notation (JSON), and/or design paradigms such as Representational State Transfer (REST), while other currently known or hereinafter developed protocols and/or design models relating and/or applicable to the instant invention. Information on an API can be released for general use or such information on the API can be protected or concealed from general use making it application specific, a combination of the two is similarly possible.

In an embodiment, the request 104 is intercepted at an API gateway 112 associated with a front end account 110 before reaching the API endpoint 120. The API gateway 112 may be a service implemented by a server, a separate computing device, or a cluster of computing devices (not depicted in FIG. 1). In an embodiment, the API gateway 112 service may be called upon as executable code, and if executed, to intercept requests from client computing devices. The API gateway 112 may then perform one or more actions, using the resources of the server, to the intercepted requests prior to connecting the client computing devices to a computing resource, other services, and/or websites. The client computing device 102 may run instructions or code using JAVA™, Python™, Node.js®, C++, Ruby, Hypertext Preprocessor (PHP), and/or other programming languages to connect to API gateway 112. In an embodiment, the request 104 from client computing device 102 is intended for the API endpoint 120. However, the software developer's kit (SDK) of the client computing device 102 may be modified such that the client computing device 102 believes that the API gateway 112 is the actual API endpoint 120. In order to do this, the endpoint-to-Domain Name Servers (DNS) look up table associated with the client computing device 102 may be altered. The look up table may be altered in a way that it can be run either using JAVA™, Python™, Node.js®, C++, Ruby, PHP, and/or other programming languages. Accordingly, the client computing device 102 may communicate with the API gateway 112 using standard Signature Version 4 Signing Process (Sigv4) calls in which are embedded standard RESTful or query-based API calls.

In an embodiment, API gateway 112 of front end account 110 serves as a proxy such that the client computing device 102 can submit requests over network 106 to access at least one computing resource from the computer resource service provider 130. The API gateway 112, as described herein, intercepts the request 104 intended for API endpoint 120. In an embodiment, the API gateway 112 and function 116 associated with front end account 110 may be in a separate account (different from the front end account 110). In an embodiment, the request 104 can be sent from the client computing device 102 directly to this separate account; rather than to the API endpoint 120 to access the computing resource 134. Furthermore, FIG. 1 illustrates a front end account 110; however, client computing device 102 may, in an embodiment, send direct requests to a different front end account before directing a request to API gateway 112 since more than one front end accounts may be implemented to practice the embodiment as described herein.

FIG. 1 illustrates a single API endpoint 120 directed to computing resource 134 of computer resource service provider 130. The API endpoint 120 may be an end of a communication channel, represented as the Uniform Resource Locater (URL), of the computing resource 134. That is, in an embodiment, the API endpoint 120 acts as an entry point to the computing resource 134 and can be accessed via the HTTP/HTTPS protocol. In an embodiment, one or more API endpoints may also be used to correspond to one or more computing resources in computer resource service provider 130. That is, computer resource service provider 130 may contain more than one computing resource than that is illustrated in FIG. 1 and more than one API endpoint may correspond to these additional computing resources.

In an embodiment, the API gateway 112 authenticates the request 104 by identifying an identity associated with the request 104. The identity is evaluated against one or more policies associated with a credential management service 114. In an embodiment, the credential management service 114 is a web service that helps securely control access to the computing resource 134 and further controls how the computing resource 134 may be used for varying users. The credential management service 114, when called upon and by using one or more policies, may authenticate and authorize the request 104 based on the identity associated with the request 104. In an embodiment, the credential management service 114 may be implemented by a server, a separate computing device, or a cluster of computing devices (not depicted in FIG. 1) such that when called upon the credential management service 114 may be provided to the API gateway 112 as executable code. If executed, the API gateway 112 may use the resources of the server, the computing device, or the cluster of computing devices to run the credential management service 114.

In an embodiment, the request 104 contains information identifying at least one credential. The credential is used to authenticate an identity of the user of a client computing device 102. In an embodiment, a credential may be a username/password combination, biometric data, a digital signature, and/or the like. The API gateway 112 may use the credential management service 114 to validate the credential with previously stored information to determine whether the identity of the request 104 can be verified or not. If the credential management service 114 validates the identity of the request 104 to have the appropriate permissions, the API gateway 112 may then have the request 104 passed to a function 116 associated with the front end account 110.

In an embodiment, the function 116 receives the request 104 at the API gateway 112. The function 116 may be triggered once the request 104 is received. The function 116 may perform a parsing and unpacking of the request 104. In an embodiment, the function 116 may be "stateless," with no affinity to the underlying infrastructure. In other words, function 116, when implemented or called upon, may not be sensitive to the state of the computation. In an embodiment, data passed through function 116 may generate and the produce the same data as output. Thus, function 116 may operate or be implemented simply to pass data or information without knowledge of the past, current, or future state changes. In an embodiment, the front end account 110 may have one or more functions be made available and the one or more functions may be provided and scaled dynamically to process incoming requests. In an embodiment, the function 116 runs code or instructions by an allocated resource instance either associated with the front end account 110 or a separate account.

In an embodiment, once the function 116 is triggered, the function 116 performs fine-grained filtering on the request 104. In an embodiment, filtering of the request 104 includes string-matching within a large case/switch statement in the function 116. If the request 104 matches a string in the function 116, an error may be returned and the request may not be forwarded to the actual API endpoint 120. The function 116 therefore is configured in the "default allow" mode. In the alternative, a "default deny" mode for function 116 may also be used that only passes on matching requests. In an embodiment, more complex filtering may be performed on the request 104, which involves allowing or denying requests based on the request content and other information, such as request history or logs by client computing device 102 gathered from the function 116.

In an embodiment, once the request 104 is filtered, a determination is made as to whether the request 104 includes information that creates, modifies, deletes, or references metadata (e.g., service tag or tag) 136 associated with the computing resource 134. In other words, the function 116, based at least in part on information from the request 104, identifies metadata 136 associated with computing resource 134. Specifically, the computing resource 134 may be accessed in response to satisfying the request 104 submitted by the client computing device 102. However, metadata 136 is also associated with the computing resource 134 and may be presented to a user device in plaintext form where the information is readily visible. In an embodiment, the metadata 136 information contained therein may include significant confidential information and without the proper protection, information may be easily observable by computer system users. As such, in an embodiment, the function 116 may call upon a key management service 118 to perform encryption operations on metadata 136.

Specifically, after metadata 136 associated with computing resource 134 has been identified, in an embodiment, the function 116 requests that metadata 136 (both key and value, if both are present) is encrypted with an AES256 key, which may be stored in a key management service 118. In an embodiment, the key management service 118 may be a part of the front end account 110 or be a service that is separate from the front end account 110. Nevertheless, the key management service 118 may be called upon by the function 116 and receive the metadata 136 so that encryption of the metadata 136 can be performed. That is, key management service 118 performs encryption on metadata 136 to generate encrypted metadata (not depicted in FIG. 1, but described in more detail with respect to FIG. 2). In an embodiment, the function 116 has encrypt and decrypt grants based at least in part on the key management service 118 policies included therein.

In an embodiment, the key management service 118 is a cryptography service that may securely manage cryptographic keys used for encrypting and decrypting and possibly for performing other cryptographic operations, such as message signing. In an embodiment, when metadata 136 is to be encrypted, the key management service 118 interface may utilize the cryptography service to encrypt the metadata 136 before the transmission back to the function 116 or even to another service.

In an embodiment, the function 116 receives the encrypted metadata back from the key management service 118. The function 116 may then generate a second or new request (not depicted in FIG. 1). In an embodiment, the second or new request is a new API call that is different from the first request (e.g., first API call). The second or new request includes or at least includes information that identifies the encrypted metadata. In an embodiment, the second or new request may be constructed by at least substituting the encrypted metadata for the metadata 136 (that was not yet encrypted). The second or new request, in an embodiment, is then used by the function 116 to make the call to the actual API endpoint 120 for access to the computing resource 134. The computing resource 134, in an embodiment, is then provided with the encrypted metadata associated with it. In an embodiment, the encrypted metadata is in ciphertext form, thereby making it difficult for computer system users to readily discern the contents therein without having to find a way to decrypt the encrypted metadata.

In an embodiment, the function 116 also runs as a role or is associated with a role, which may further limit how requests are handled and forwarded to the actual API endpoint 120. In an embodiment, the role is a set of permissions that grant access to services and computing resources in the computer resource service provider 130. The permissions are associated with the role, and not specifically tied to a user. As such, in an embodiment, the role may provide further limitations as to which requests from client computing device 102 may invoke the front end account 110.

In other words, the function 116 (as a role or when associated with a role) runs and serves to perform permissions limitation on the set of requests that the client computing device 102 is able to invoke via the interface of the front end account 110. The function 116, when running as a role or associated with a role, is assigned cross-account permissions and managed in the computer resource service provider 130 where the computing resources, such as computing resource 134, reside. The resource account management service 132 in the computer resource service provider 130 may be a service that is similar to that of the credential management service 114 of the front end account 110. In an embodiment, the resource account management service 132 may include one or more policies that only allow requests to be called via the function, when the function is running as a role or associated with a role. This way, client computing device 102 cannot access the computer resource service provider 130 directly without some type of permissions check or management.

Figure 2:
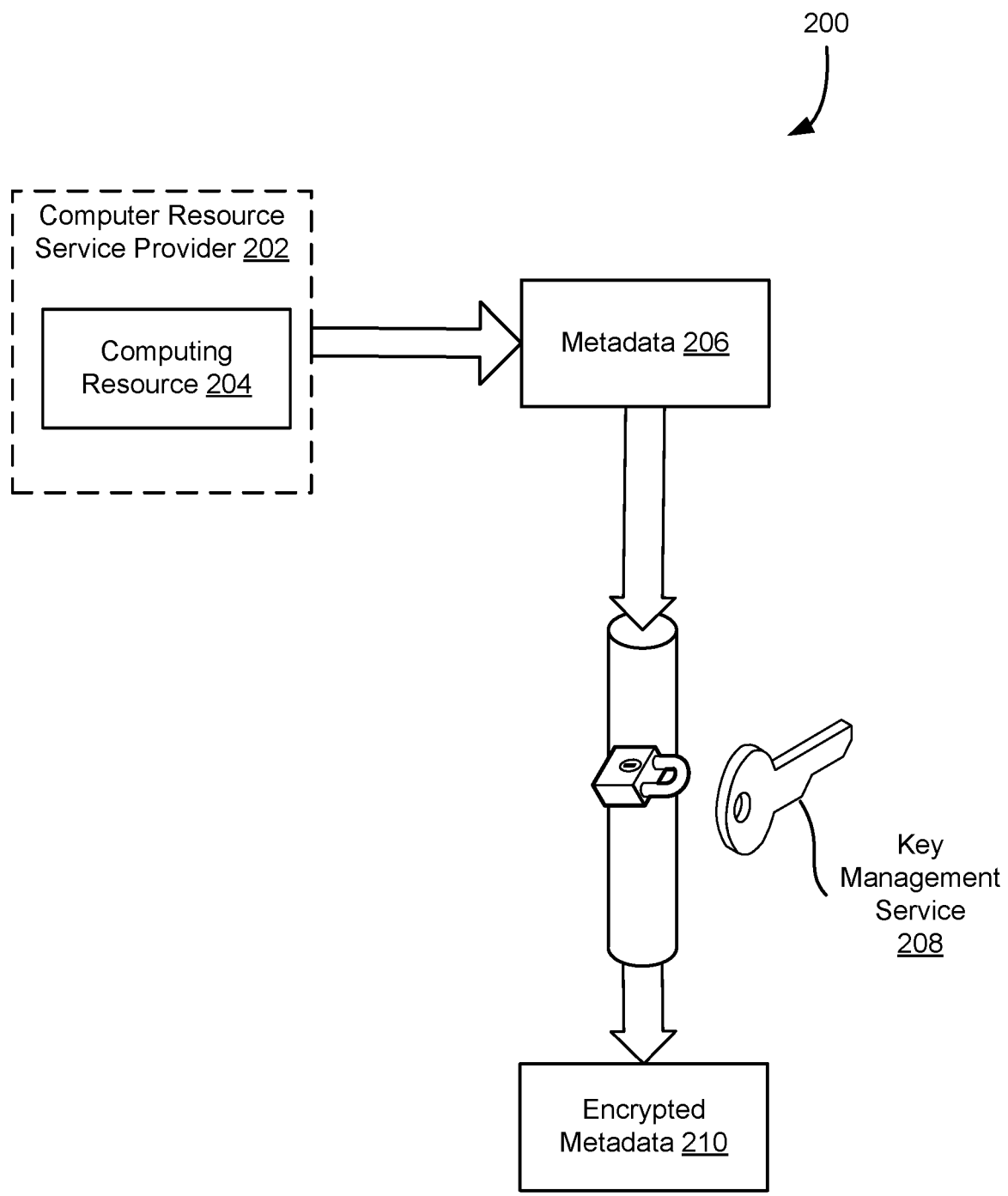
FIG. 2 illustrates a diagram for generating encrypted metadata using a key management service.

FIG. 2 illustrates, in an embodiment, a diagram of encrypting metadata using a key management service. As described above with respect to FIG. 1, FIG. 2 also illustrates a computing resource 204 of computer resource service provider 202 that may be associated with metadata 206. Metadata 206 may be data that provides information about other data. In an embodiment, metadata 206 may include information such as when an electronic file was created, the user device who created the electronic file, when the electronic file was last updated, the file size, file extension, and etc. Moreover, metadata 206 may be in any form described as a key-value pair. In an embodiment, the key includes up to 127 characters of Unicode Transformation Format-8 bit (UTF-8), and the value includes up to 225 characters of UTF-8." In an embodiment, metadata 206 may be stored with the electronic file itself or in a separate file from the electronic file. In an embodiment, metadata 206 may contain significant confidential information that may also require protection so that information contained therein are not shared with certain user devices even if the user device has permission to access the computing resource 204. In an embodiment, metadata 206 may contain information that if shown to certain persons without authorization may violate Health Insurance Portability and Accountability Act of 1996 (HIPAA) rules.

Moreover, in an embodiment, metadata 206 may include information about computing resource 204. Typically, metadata 206 associated with the computing resource 204 are visible to user devices once the device has been granted access to the computing resource 204. Hence, in an embodiment, the metadata 206 may be encrypted so as to prevent user devices from freely viewing the contents therein. Thus, in an embodiment, function 116 (as depicted in FIG. 1) may call upon a key management service 208 (similar to key management service 118 as described with respect to FIG. 1) to encrypt the metadata 206. The key management service 208 may be a part of the front end account 110. In an embodiment, the key management service 208 uses an AES256 key to encrypt the metadata 206 to generate encrypted metadata 210. In an embodiment, the key management service 208 may also use different encryption keys, operations, and/or algorithms to encrypt the metadata 206.

In an embodiment, key management service 208 may utilize symmetric and/or asymmetric cryptographic primitives (algorithms) to encrypt metadata 206. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

In an embodiment, metadata 206 is originally in plaintext form such that users who may have gained access to computing resource 204 may also view the contents of the metadata 206. However, after using the key management service 208, encrypted metadata 210 is generated and is ready to be applied to or associated with the computing resource 204. That is, in an embodiment, the key management service 208 returns a response by sending the encrypted metadata 210 to the function 116 such that the encrypted metadata 210 can eventually be associated with the computing resource 204.

In an embodiment, as described above with respect to FIG. 1, the function 116 creates, generates, or constructs a second or new request to include the encrypted metadata 210 information. The encrypted metadata 210, in an embodiment, would then be displayed or shown as ciphertext to a user device who has access to the computing computer resource 204.

In an embodiment, the key management service 208 may be a part of the front end account 110 (as depicted in FIG. 1). However, in an embodiment, the key management service 208 may be separate from the front end account 110 and called upon by the function 116 when needed. Moreover, the key management service 208 may also be configured with an interface such that the interface may call on a separate cryptography service (not depicted in FIG. 2), if necessary, to perform the encryption operations.

In an embodiment, the function 116 may first determine whether metadata 206 associated with computing resource 204 is already encrypted or not. This process is described in further detail below with respect to FIG. 4. If portions or the entirety of metadata 206 have not yet been encrypted, in an embodiment, the function 116 may then call the key management service 208 to encrypt the metadata 206 in order to generate the encrypted metadata 210. The encrypted metadata 210 may then be sent back to the function 116 for further analysis and processing.

Figure 3:
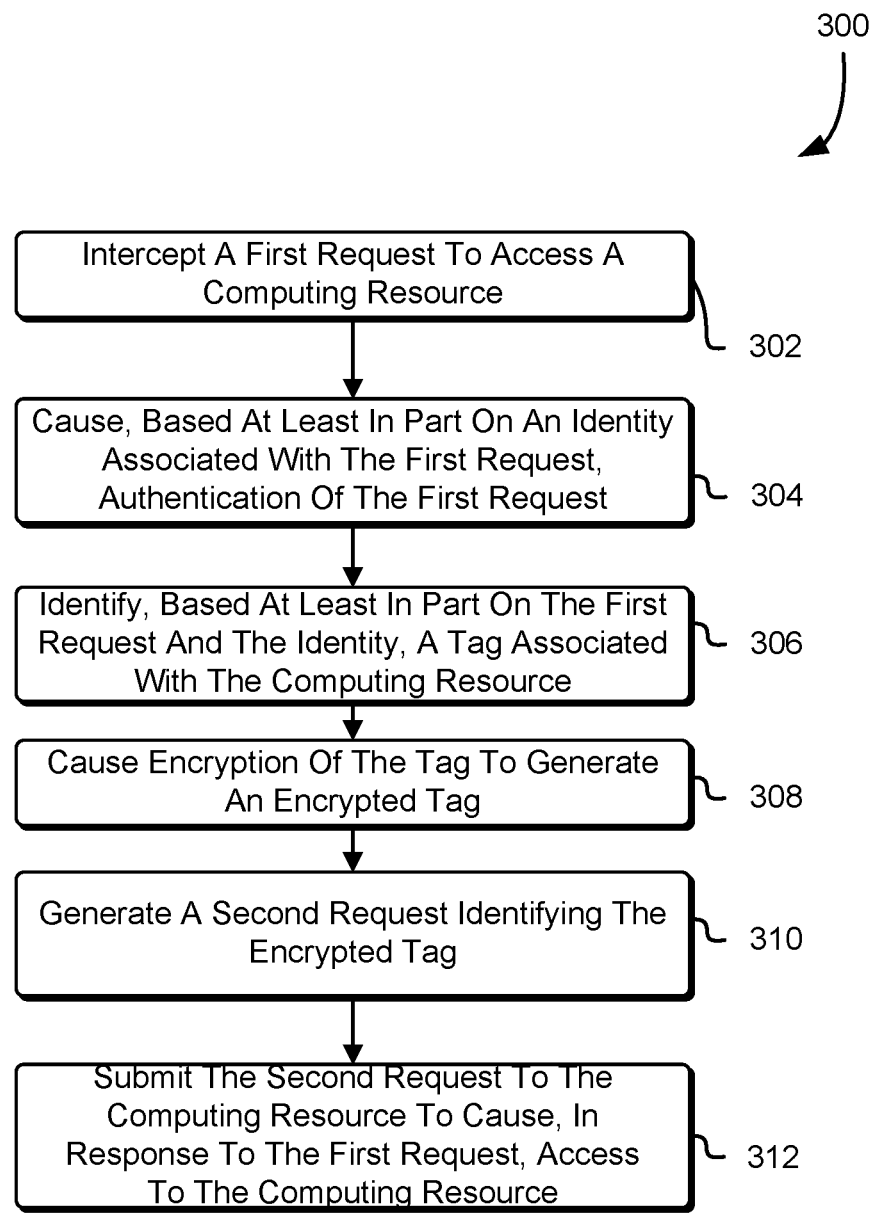
FIG. 3 illustrates a process for generating encrypted metadata.

In an embodiment, FIG. 3 shows an illustration of a process 300 for generating encrypted metadata. The process 300 may be performed by any suitable entity using hardware, software, or a combination thereof, such as at least some of the entities described in connection with FIGS. 1 and 2. In 302, in an embodiment, a first request (e.g., first API call) from a client computing device intended for an API endpoint to access a computing resource is intercepted at an API gateway. The API gateway may be associated with a front end account that intercepts the requests from client computing device. The client computing device may have its SDK modified such that the client computing device believes that the API gateway is the API endpoint. In an embodiment, and as described in reference to FIG. 1, the endpoint-to-DNS lookup table can be changed for different types of programming languages. The first request may be sent from a client computing device over a network either via a wired or wireless connection and the client computing device may communicate with the API gateway using standard Sigv4 calls.

In an embodiment, the first request may include information such as the identity of requestor and/or the user device. In 304, in an embodiment, the first request may be authenticated by at least evaluating the identity associated with the first request against one or more policies of a credential management service associated with front end account. The API gateway, which intercepted the first request, may verify both the first request's authentication and authorization against one or more policies provided by the credential management service. In other words, the API gateway determines whether the requestor or user device that sent the first request has permission to access the particular computing resource that the first request is intended for.

Specifically, in 304, in an embodiment, the first request contains information identifying at least one credential. The credential is used to authenticate an identity of the user of a client computing device. In an embodiment, a credential may be a username/password combination, biometric data, a digital signature, and/or the like. The API gateway may use the credential management service to validate the credential with previously stored information to determine whether the identity of the first request can be verified or not. If the credential management service validates the identity of the first request to have the appropriate permissions, the first request is then passed on to a function of the front end account.

In 306, in an embodiment, the function receives the verified and authenticated first request and performs actions to ensure that metadata (e.g., service tag or tag) associated with the computing resource that the request is intended for is secure. In an embodiment, the function performs fine-grained filtering on the first request. Once the fine-grained filtering has been performed, information from the first request and the identity associated with the first request may be used to identify the metadata (e.g., service tag or tag) associated with the computing resource. This metadata (e.g., service tag or tag) is isolated from the computing resource. In an embodiment, as shown in 308, the function then calls upon a key management service to encrypt the metadata (e.g., service tag or tag) with an encryption key such that encrypted metadata (e.g., encryption service tag or encryption tag) is generated.

The key management service may be a service that is associated with the front end account or it may be a separate service located in a different account from the front end account. The key management service may encrypt the metadata (e.g., service tag or tag) with an AES256 key or another similar type of key, which may be stored in the key management service.

In an embodiment, the key management service is a cryptography service that may securely manage and provide cryptographic keys used for encrypting and decrypting and possibly for performing other cryptographic operations, such as message signing. In an embodiment, when metadata (e.g., service tag or tag) associated with the computing resource is to be encrypted, the key management service interface may utilize the cryptography service to encrypt the metadata (e.g., service tag or tag) before the metadata (e.g., service tag or tag) is transmitted to another service. After the encrypted metadata (e.g., encrypted service tag or encrypted tag) is generated, the key management service then sends the encrypted metadata (e.g., encrypted service tag or encrypted tag) back to the function.

In 310, in an embodiment, the function generates a second or new request that identifies the encrypted metadata (e.g., encrypted service tag or encrypted tag). In an embodiment, the function generates a second or new request by including information indicating a reference of the encrypted metadata (e.g., encrypted service tag or encrypted tag). In an embodiment, the function may generate a new or second request by replacing the original metadata (e.g., service tag or tag) associated with the computing resource with the encrypted metadata (e.g., encrypted service tag or encrypted tag). In other words, the second or new request may be generated based at least in part on the encrypted metadata (e.g., encrypted service tag or encrypted tag) replacing the original metadata (e.g., service tag or tag).

In 312, in an embodiment, the new or second request is then used by the function to make the call to the actual API endpoint for access to the computing resource. In other words, the new or second request is submitted to access the computing resource that was originally requested by the first request. The metadata (e.g., service tag or tag) associated with the computing resource, when accessed, are now encrypted so that even if a user who has access to the computing resource may not be able to obtain the information in the metadata associated with the computing resource. That is, in an embodiment, the computing resource now includes encrypted metadata (e.g., encrypted service tag or encrypted tag). This is due to the fact that metadata (e.g., service tag or tag) may include sensitive or important information, so encrypting the information contained therein restricts certain user devices from being able to effortlessly access it. Specifically, in an embodiment, the encrypted metadata (e.g., encrypted service tag or encrypted tag) is in ciphertext form and would be incomprehensible when displayed on a user device.

Figure 4:
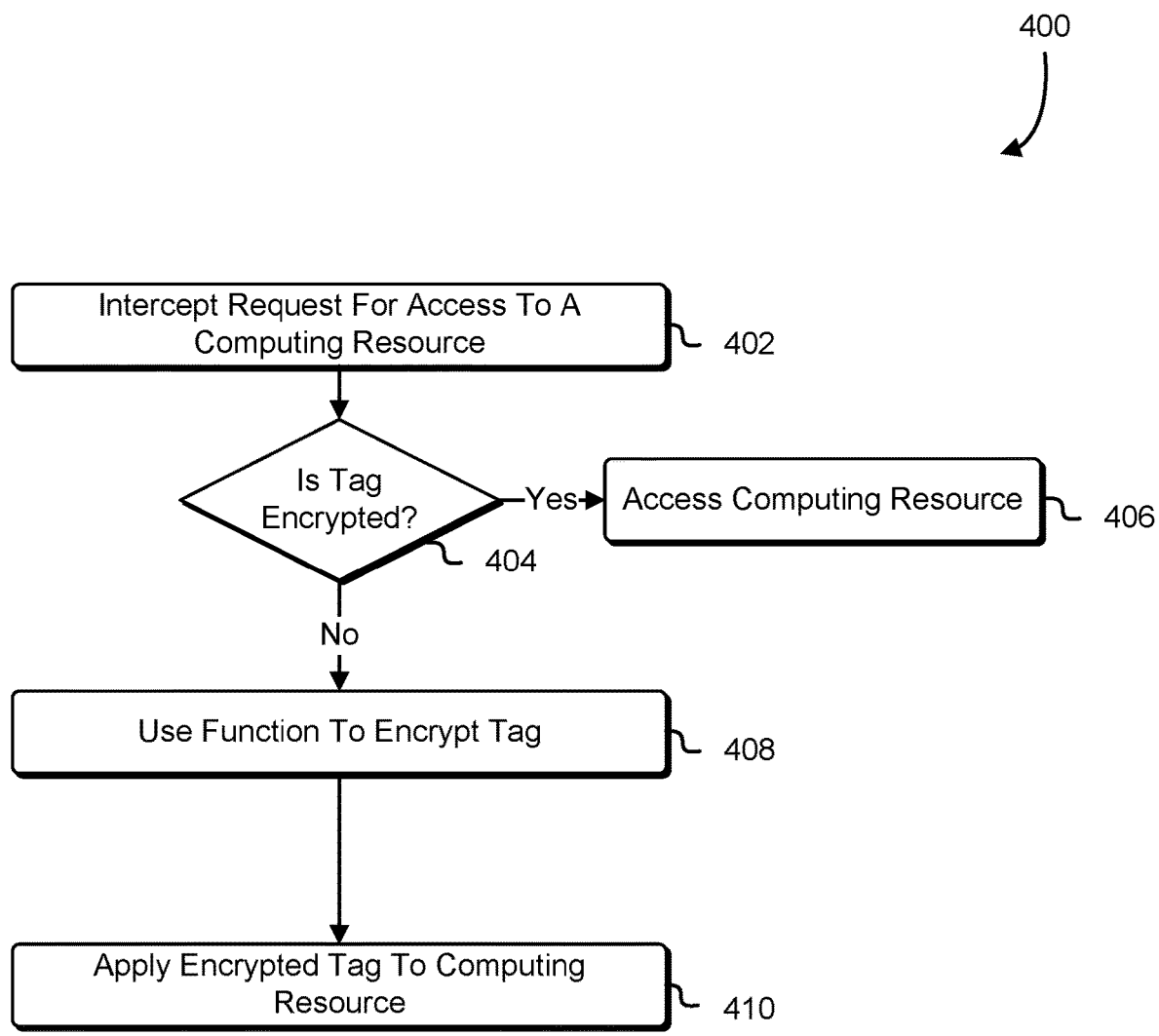
FIG. 4 illustrates a process for determining whether metadata has been encrypted prior to generating encrypted metadata.

FIG. 4 is illustrative of a process 400 for determining whether metadata (e.g., service tag or tag) is encrypted prior to encrypting the metadata. In an embodiment, as shown in 402, the request (e.g., API call) from a client computing device for access to a computing resource may be intercepted at an API gateway. The client computing device may have its lookup table modified such that the API gateway appears to the client computing device as the actual API endpoint that the client computing device is attempting to access for computing resources. Specifically, in an embodiment, the API gateway may intercept requests from the client computing device and perform actions in response to the request prior to the request being satisfied.

In 404, in an embodiment, the API gateway may determine whether the metadata (e.g., service tag or tag) associated with the computing resource that the request is intended to access has already been encrypted. If so, as shown in 406, the computing resource may directly be accessed using the request so long as the request passes all the verification and authentication tests provided by at least one or more policies of a credential management service of a front end account and/or resource management service associated with a resource environment. If not, as shown in 408, the request may then be sent to a function, which may then in turn call on a key management service to encrypt the metadata associated with the requested computing resource. That is, after the API gateway has authorized and verified that the request is legitimate based at least in part on the identity associated with the request, the API gateway's function may request that a key management service perform encryption operations on the metadata (e.g., service tag or tag).

In 410, in an embodiment, when the key management service receives the metadata (e.g., service tag or tag) and has encrypted the metadata (e.g., service tag or tag), the encrypted metadata (e.g., encrypted service tag or encrypted tag) is then sent back to the function. The function then reconstructs the request to generate a new or second request identifying the encrypted metadata (e.g., encrypted service tag or encrypted tag). The new or second request, in an embodiment, may be generated simply by replacing or substituting out the original metadata (e.g., service tag or tag) associated with the computing resource with the encrypted metadata (e.g., encrypted service tag or encrypted tag). In an embodiment, the new or second request may also be generated by including information indicating a reference to the encrypted metadata (e.g., encrypted service tag or encrypted tag). The new or second request is then used by the function to make the final call to the API endpoint. The API endpoint may then respond by providing the computing resource from the computer resource service provider as indicated in the first request. The computing resource, in an embodiment, when accessed, now includes encrypted metadata (e.g., encrypted service tag or encrypted tag) information. The encrypted metadata (e.g., encrypted service tag or encrypted tag) may be in the form of ciphertext so that it is not easily discernable on a user device.

Figure 5:
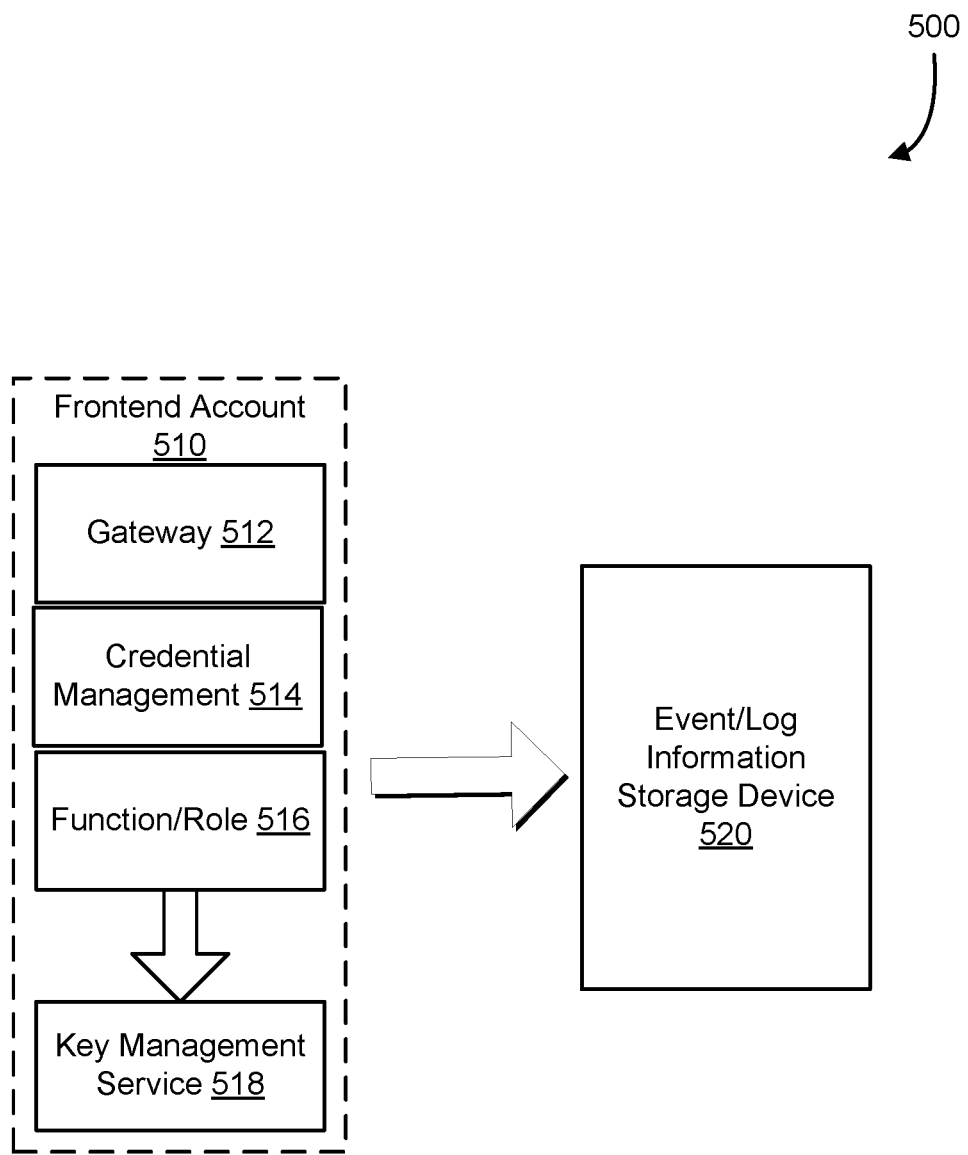
FIG. 5 illustrates, in an embodiment, a diagram of a system of unpacking a request and storing information extracted from the request to a storage device may be practiced.

FIG. 5 illustrates, in an embodiment, a diagram 500 of a system unpacking a request and storing information extracted from the request to a storage device may be practiced. In an embodiment, the API gateway 512 verifies the client's authentication and authorization against one or more policies provided from a credential management service 514 associated with a front end account 510. The request is unpacked and logs and/or details of the request and may be passed on to a separate storage device 520. The storage device 520 may be a physical storage device such as a Universal Serial Bus (USB) device or solid state hard drive. However, in an embodiment, the storage device 520 may also be a virtual storage device. In an embodiment, the virtual storage device may be set up with write-only sharing, versioning and either or both of MFA Delete and lifecycle policy to rotate into a vault-locked archive. In an embodiment, once the request has been unpacked and the details of the request have been stored, the request is then passed to function 516 to determine whether the metadata associated with the computing resource needs to be encrypted through the use of a key management service 518.

Figure 6:
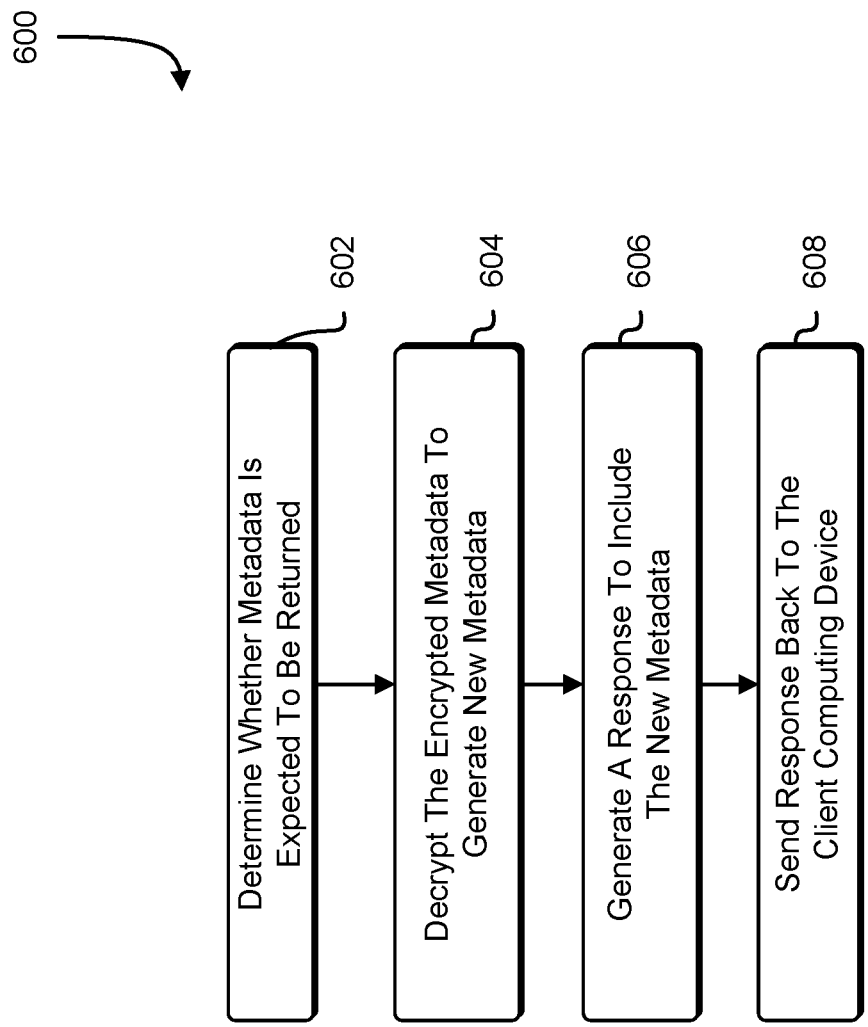
FIG. 6 illustrates a process for decrypting metadata and returning a response with the decrypted metadata back to a client device.

FIG. 6 illustrates a process 600 for determining whether information in the encrypted metadata is expected to be returned to a client computing device. In 602, in an embodiment, a determination is made, at the function associated with a front end account, whether information from the encrypted metadata is expected to be returned. In an embodiment, when the API endpoint returns a response to the request, the function, at the API gateway first receives the response and parses it. If the response contains metadata or tag information where metadata is expected to be returned, the function identifies the encrypted metadata from its position in the response's JSON structure and sends it to a key management service.

In 604, in an embodiment, the key management service uses an AES256 key to decrypt the encrypted metadata. As known to those skilled in the art, there may be other types of decryption keys, operations, or algorithms that may be performed on the encrypted metadata to decrypt it. As noted above with respect to the description of FIGS. 1-5, the key management service, in an embodiment, is a cryptography service that may securely manage cryptographic keys used for encrypting and decrypting. In an embodiment, when metadata (e.g., service tag or tag) associated with the computing resource is to be encrypted, the key management service interface may utilize the cryptography service to encrypt the metadata (e.g., service tag or tag) before the metadata (e.g., service tag or tag) is transmitted to another service. After the encrypted metadata (e.g., encrypted service tag or encrypted tag) is decrypted, the key management service then sends the decrypted metadata in the form of plaintext back to the function at the API gateway. In an embodiment, the decrypted metadata may be referred to as new metadata. In an embodiment, the new metadata may simply just contain information that was identical to the information in the metadata prior to encryption process as described in FIGS. 1-4.

In 606, in an embodiment, the new metadata, in the form of plaintext, is inserted in a response. The response is then subsequently sent, by the function via the API gateway back to the client computing device.

In 608, in an embodiment, the plaintext is then returned to the client computing device. In an embodiment, the response back to the client computing device may appear to the client computing device that the response came back directly from the API endpoint and not through an API gateway.

Figure 7:
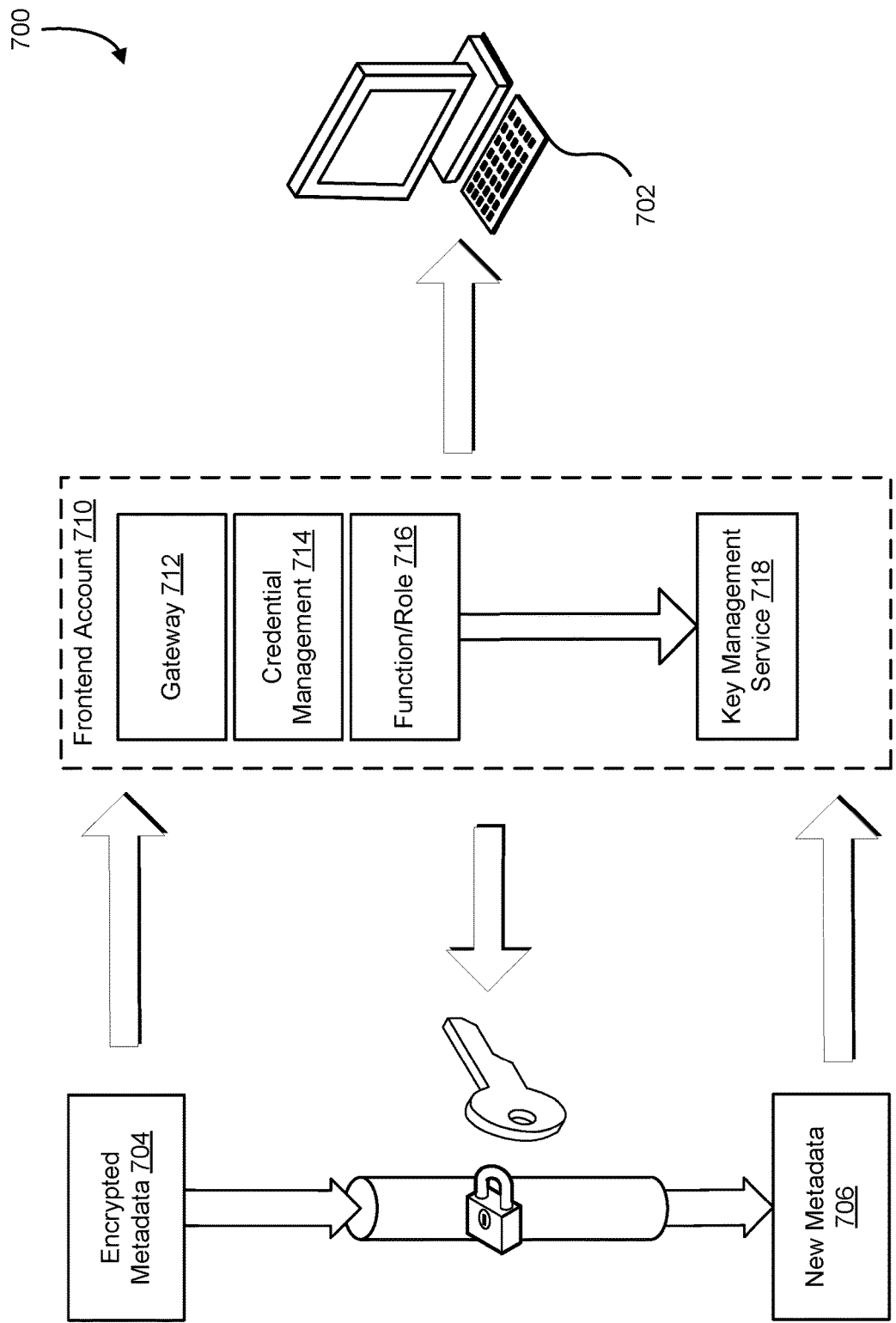
FIG. 7 illustrates a diagram for returning a response to the request.

FIG. 7 illustrates a diagram 700, in an embodiment, of a system of decrypting the encrypted tag or encrypted metadata using a key management service and sending it back to a client computing device may be practiced. As described in the process 600 shown in FIG. 6, the encrypted metadata 704 may include information identifying that a response to the request is required. The API gateway 712 parses the information from the encrypted metadata 704 and determines that the encrypted metadata 704 information included therein is expected to be returned. As such, the function 716 calls the key management service 718 and sends the encrypted metadata 704 to be decrypted. The key management service 718 may be part of the front end account 710 or separately located in a different account.

In an embodiment, at the key management service 718, the decryption is performed using an AES256 key on the encrypted metadata 704. As described in FIG. 6 above, the key management service 718, in an embodiment, is a cryptography service. In an embodiment, the key management service 718 may also call a cryptography service that may securely manage cryptographic keys used for encrypting and decrypting. In an embodiment, the key management service 718 decrypts the encrypted metadata 704 such that new metadata 706 is generated. The new metadata 706 is generated and can display information in plaintext form. The new metadata 706 may include information that was identical to the information contained therein before the encryption process as described in FIGS. 1-4. Accordingly, once the function 716 receives the new metadata 706 back from key management service 718, the function 716 then inserts the plaintext into the metadata associated with the requested computing resource and generates a response accordingly. The function 716 sends this generated response back to client computing device 702. This way, client computing device 702 may receive the response and a user associated with the client computing device 702 may comprehend and see the information contained in the metadata.

Figure 8:
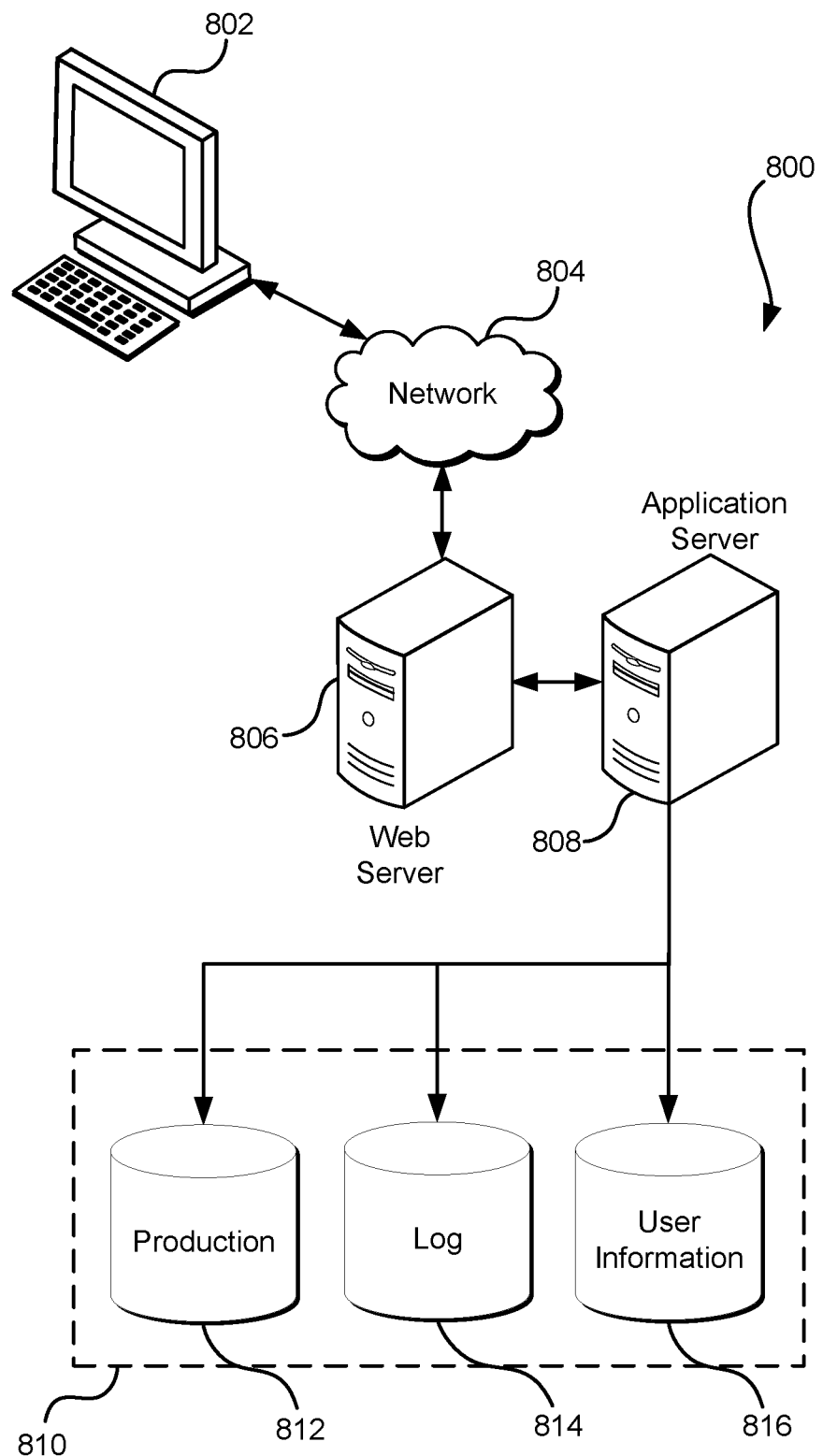
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client computing device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. The application server 808 may provide static, dynamic, or a combination of static and dynamic data in response to the received instructions. Dynamic data, such as data used in web logs (blogs), shopping applications, news services, and other such applications, may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in an embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dumb terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these, and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware, or combinations thereof. The code may be stored on computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   intercepting a first request to access a computing resource;
   causing, based at least in part on an identity associated with the first request, authentication of the first request; and
   causing a stateless function to run as code to:
      parse the first request for a tag associated with the requested computing resource;
      call a key management service to cause encryption of the tag to generate an encrypted tag;
      generate a second request identifying the encrypted tag; and
      submit the second request to the computing resource to cause, in response to the first request, access to the computing resource.

2. The computer-implemented method of claim 1, wherein the first request is an application programming interface call and the second request is a new application programming interface call.

3. The computer-implemented method of claim 2, further comprising:
   unpacking the application programming interface call; and
   storing information from the unpacked application programming interface call in a storage device.

4. The computer-implemented method of claim 1, wherein authenticating the first request further comprises:
   evaluating the identity associated with the first request with one or more policies specifying whether actions associated with the identity are performable with the computing resource.

5. A system, comprising:
   memory to store instructions which, as a result of being executed by one or more processors of the system, cause the system to at least:
      obtain a first request for access to a computing resource;
      identify a stateless function that is to be run as code to parse the first request to identify metadata associated with the computing resource; and
      use the stateless function to:
         cause encryption of the metadata to generate encrypted metadata;
         generate a second request that includes the encrypted metadata; and
         cause, using the second request, the computing resource to be accessed in response to the first request.

6. The system of claim 5, wherein the instructions, as a result of being executed by the one or more processors of the system, further cause the system to:
   identify, based at least in part on the first request, an identity associated with the first request; and
   authenticate, based at least in part on the identity, the first request.

7. The system of claim 6, wherein authenticating the first request further comprises instructions that, as a result of being executed by the one or more processors of the system, further cause the system to:
   evaluate the identity associated with the first request with one or more policies specifying whether actions associated with the identity are performable with the computing resource.

8. The system of claim 5, wherein the instructions, as a result of being executed by the one or more processors of the system, further cause the system to:
   determine whether the metadata associated with the computing resource is encrypted.

9. The system of claim 8, wherein, based at least in part on the determination that the metadata is not encrypted, provide a cryptographic key to encrypt the metadata to generate the encrypted metadata.

10. The system of claim 5, wherein the second request that includes the encrypted metadata is generated by reconstructing the first request and substituting the encrypted metadata to replace the metadata.

11. The system of claim 5, wherein the instructions, as a result of being executed by the one or more processors of the system, further cause the system to:
   display the encrypted metadata as ciphertext.

12. The system of claim 5 wherein the instructions, as a result of being executed by the one or more processors of the system, further cause the system to:
   decrypt the encrypted metadata to generate new metadata; and
   generate a response including the new metadata to the second request.

13. A non-transitory computer-readable storage medium comprising instructions that, as a result of being executed by one or more processors of a computer system, cause the computer system to at least:
   obtain a first request, at an application programing interface (API) gateway, for access to a computing resource; and call a stateless function, at the API gateway, such that the stateless function is to be run as code to:
  identify, based at least in part on the first request, metadata associated with the computing resource;
  cause to be encrypted the metadata to generate encrypted metadata;
  generate a second request that includes the encrypted metadata; and
  cause, using the second request, the computing resource to be accessed in response to the first request.

14. The non-transitory computer-readable storage medium of claim 13, wherein the instructions further comprise instructions that, as a result of being executed by the one or more processors, cause the computer system to:
  identify, based at least in part on the first request, an identity associated with the first request; and
  authenticate, based at least in part on the identity, the first request.

15. The non-transitory computer-readable storage medium of claim 14, wherein the instructions further comprise instructions that, as a result of being executed by the one or more processors, cause the computer system to:
  evaluate the identity associated with the first request with one or more policies specifying whether actions associated with the identity are performable with the computing resource.

16. The non-transitory computer-readable storage medium of claim 13, wherein the instructions further comprise instructions that, as a result of being executed by the one or more processors, cause the computer system to:
  determine whether the metadata associated with the computing resource is encrypted.

17. The non-transitory computer-readable storage medium of claim 16, wherein, based at least in part on the determination that the metadata is not encrypted, provide a cryptographic key to encrypt the metadata to generate the encrypted metadata.

18. The non-transitory computer-readable storage medium of claim 13, wherein the second request that includes the encrypted metadata is generated by reconstructing the first request and substituting the encrypted metadata to replace the metadata.

19. The non-transitory computer-readable storage medium of claim 13, wherein the instructions further comprise instructions that, as a result of being executed by the one or more processors, cause the computer system to:
  display the encrypted metadata as ciphertext.

20. The non-transitory computer-readable storage medium of claim 13, wherein the instructions further comprise instructions that, as a result of being executed by the one or more processors, cause the computer system to:
  decrypt the encrypted metadata to generate new metadata; and
  generate a response including the new metadata to the second request.

\* \* \* \* \*